US012686893B2

(12) United States Patent     (10) Patent No.:   US 12,686,893 B2

True et al.     (45) Date of Patent:    Jul. 21, 2026

(54) DIRECT REDUCED IRON SYSTEM AND METHOD

(71) Applicant: Nucor Corporation, Charlotte, NC (US)

(72) Inventors: Brad True, Rock Hill, SC (US); Lindsay Leveen, Sausalito, CA (US); Mirmohammadyousef Motamedhashemi, Gonzales, LA (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

(21) Appl. No.: 18/799,808

(22) Filed: Aug. 9, 2024

(65) Prior Publication Data

US 2024/0401160 A1     Dec. 5, 2024

Related U.S. Application Data

(63) Continuation of application No. 17/533,480, filed on Nov. 23, 2021, now Pat. No. 12,060,622.

(Continued)

(51) Int. Cl.
*C21B 13/00*     (2006.01)
*C01B 3/025*     (2026.01)
(Continued)

(52) U.S. Cl.
CPC .......... C21B 13/0073 (2013.01); C01B 3/025 (2013.01); C01B 3/36 (2013.01);
(Continued)

(58) Field of Classification Search
CPC ............ C21B 13/0033; C21B 13/0073; C21B 13/0086; C21B 2100/22; C21B 2100/26;
(Continued)

(56) References Cited

U.S. PATENT DOCUMENTS 3,303,017 A   *   2/1967   Mayer ................. C21B 13/0033
                                 252/373
3,853,538 A     12/1974   Nemeth
(Continued)

FOREIGN PATENT DOCUMENTS

CN       104045057 A     9/2014
CN       103276133 B     1/2015
(Continued)

OTHER PUBLICATIONS

Canadian Patent Office; Office Action for Canadian Patent Application No. 3144748 dated Apr. 10, 2025, 5 Pages.
(Continued)

*Primary Examiner* — Latosha Hines
(74) *Attorney, Agent, or Firm* — Christopher J. Knors; Moore & Van Allen PLLC

(57)            ABSTRACT

A method of direct reduction of iron (DRI) is disclosed, the method comprising generating metallic iron by removing oxygen from iron ore using a reducing gaseous mixture with excess carbon monoxide that produces an excess $CO_2$ by-product is provided. $CO_2$ by-product is optionally sequestered. A system for carrying out the method is also disclosed.

10 Claims, 4 Drawing Sheets

Related U.S. Application Data

(60) Provisional application No. 63/141,399, filed on Jan. 25, 2021, provisional application No. 63/134,815, filed on Jan. 7, 2021.

(51) Int. Cl.

| | |
|---|---|
| *C01B 3/36* | (2026.01) |
| *C01C 1/04* | (2006.01) |
| *C10G 2/00* | (2006.01) |
| *C10L 1/08* | (2006.01) |

(52) U.S. Cl.

CPC ................ *C01C 1/04* (2013.01); *C10G 2/50* (2013.01); *C10L 1/08* (2013.01); *C01B 2203/0255* (2013.01); *C01B 2203/062* (2013.01); *C01B 2203/068* (2013.01); *C10G 2400/08* (2013.01); *C10L 2200/043* (2013.01); *C10L 2270/04* (2013.01); *C10L 2290/42* (2013.01)

(58) Field of Classification Search

CPC .......... C21B 2100/282; C21B 2100/44; C21B 2100/64; C01B 2203/0233; C01B 2203/025; C01B 2203/0255; C01B 2203/0415; C01B 2203/043; C01B 2203/046; C01B 2203/047; C01B 2203/0495; C01B 2203/06; C01B 2203/061; C01B 2203/062; C01B 2203/068; C01B 2203/86; C01B 3/025; C01B 3/34; C01B 3/36; C01B 3/50; C01C 1/04; C10G 2/50; C10G 2400/08; C10L 1/08; C10L 2200/043; C10L 2270/04; C10L 2290/42

See application file for complete search history.

(56) References Cited

U.S. PATENT DOCUMENTS

| | | | |
|---|---|---|---|
| 4,564,389 A | 1/1986 | Yamaoka et al. | |
| 5,676,732 A | 10/1997 | Viramontes-Brown et al. | |
| 6,149,859 A | 11/2000 | Jahnke et al. | |
| 7,767,191 B2 | 8/2010 | Thomas et al. | |
| 7,931,731 B2 | 4/2011 | Van Heeringen et al. | |
| 8,551,213 B2 | 10/2013 | Tateishi et al. | |
| 8,940,076 B2 * | 1/2015 | Duarte-Escareno .... C21B 13/02 75/505 |
| 9,377,242 B2 | 6/2016 | Millner et al. | |
| 9,938,595 B2 | 4/2018 | Becerra-Novoa et al. | |

| | | | |
|---|---|---|---|
| 2011/0314966 A1 | 12/2011 | Iijima et al. | |
| 2012/0174710 A1 * | 7/2012 | Millner ..................... C22B 5/12 266/144 |
| 2015/0345869 A1 * | 12/2015 | Millner ................. F27D 17/302 266/156 |
| 2016/0002744 A1 | 1/2016 | Becerra-Novoa et al. | |

FOREIGN PATENT DOCUMENTS

| | | | | | |
|---|---|---|---|---|---|
| EP | 2574683 | A1 | 4/2013 | | |
| EP | 3156519 | A1 | 4/2017 | | |
| JP | 2002161303 | A | 6/2002 | | |
| MX | 368822 | B | 10/2019 | | |
| MX | 382579 | B | 3/2025 | | |
| WO | 2011029792 | A1 | 3/2011 | | |
| WO | 2012059255 | A1 | 5/2012 | | |
| WO | WO-2013064870 | A1 * | 5/2013 | ............... | C01B 3/56 |
| WO | 2014126631 | A2 | 8/2014 | | |
| WO | WO-2015016950 | A1 * | 2/2015 | ............ | C21B 11/02 |

OTHER PUBLICATIONS

Mexican Patent Office; Office Action for Mexican Patent Application No. MX/a/2022/000305 dated Apr. 15, 2025, 6 Pages.

U.S. Appl. No. 17/533,480, filed Nov. 23, 2021, now, Pending

U.S. Department of the Interior; "The Concept of Geologic Carbon Sequestration," U.S. Geological Survey, 2011, 2 Pages, Fact Sheet 2010-3122.

Di Doris Wall; Export Gases and their Utilization Potential; pp. 1-171, in particular Abstract, p. 56 et seq. and p. 115 et seq.; 2012; Montanuniveristat Leoben; Leoben.

U.S. Department of the Interior; "National Assessment of Geologic Carbon Dioxide Storage Resources Results", U.S. Geological Survey, 2013, 54 Pages, Circular 1386, Version 1.1.

Gooya,R., et al; "Unstable, Super Critical CO2—Water Displacement in Fine Grained Porous Media under Geologic Carbon Sequestration Conditions", Scientific Reports, 2019, pp. 1-9, vol. 9:11272.

Vijeta Arora, Rishabh Kumar Saran, Raj Kumar, and Shashikant Yadav; Separation and sequestration of CO2 in geological formations; pp. 647-656, in particular Abstract and p. 1, Introduction; 2019; Materials Science for Energy Technologies 2.

Stefan Schlulter and Christian Geitner; Simulation of Methanol and Urea Production from Catalytic Conversion of Steel Mill Gases; pp. 1-14, in particular Abstract and p. 1, Introduction; 2020; Chemie Ingenieur Technik.

Canadian Patent Office; Office Action for Canadian Patent Application No. 3,144,748 dated Jan. 18, 2024, 5 Pages.

Canadian Intellectual Property Office; Office Action for Canadian Patent Application No. 3,144,748 dated Mar. 20, 2026, 4 Pages.

* cited by examiner

DIRECT REDUCED IRON SYSTEM AND METHOD

CROSS-REFERENCE TO RELATED APPLICATIONS

This application is a continuation of U.S. patent application Ser. No. 17/533,480, filed Nov. 23, 2021, which claims the benefit of U.S. Provisional Application No. 63/134,815 filed on Jan. 7, 2021, and U.S. Provisional Application No. 63/141,399 filed on Jan. 25, 2021, the entirety of each of which is incorporated herein by reference.

TECHNICAL FIELD

This disclosure is directed to methods and systems of direct reducing iron ore. In one example, the method includes sequestering of carbon dioxide. In another example, the method includes providing for blue ammonia production. In yet another example, the method includes providing for blue hydrocarbon fuel production.

BACKGROUND

Direct reduction of iron (DRI) is a process that generates metallic iron from its oxide ore by removing oxygen from the iron ore using a reducing gas, typically provided from a synthesis gas ("syngas"). Industrially applied DRI processes include HyL, MIDREX, and FINMET. There remains continued interest in manufacturing processes that reduce or eliminate the release of carbon dioxide ($CO_2$) either directly or indirectly into the atmosphere. Such processes, where $CO_2$ emission to the atmosphere is reduced or eliminated, are generally referred to as "blue" processes, and products produced therefrom are "blue" products.

SUMMARY

In one example, a method of direct reduction of iron (DRI) is provided, the method comprising generating metallic iron from its ore by removing oxygen from the ore using a reducing gaseous mixture feed that produces a carbon dioxide ($CO_2$) by-product and geologically sequestrating the $CO_2$ by-product.

In one aspect, the reducing gaseous mixture feed comprises hydrogen and carbon monoxide (CO). In another aspect, alone or in combination with any one of the previous aspects, additional carbon monoxide is added to the reducing gaseous mixture feed.

In another aspect, alone or in combination with any one of the previous aspects, the $CO_2$ by-product is separated from water vapor and unreacted reducing gaseous mixture feed prior to geological sequestering. In another aspect, alone or in combination with any one of the previous aspects, the $CO_2$ by-product is dried prior to geological sequestering. In another aspect, alone or in combination with any one of the previous aspects, the $CO_2$ by-product is compressed to a supercritical state prior to geological sequestering. In another aspect, alone or in combination with any one of the previous aspects, unreacted hydrogen from the reducing gaseous mixture feed is separated from water vapor and unreacted reducing gaseous mixture feed prior to geological sequestering.

In another aspect, alone or in combination with any one of the previous aspects, unreacted carbon monoxide from the is recycled to the reducing gaseous mixture feed. In another aspect, alone or in combination with any one of the previous aspects, unreacted carbon monoxide is recycled to the reducing gaseous mixture feed such that a concentration ratio of hydrogen to carbon monoxide ($H_2/CO$) introduced to a direct reduction unit comprising iron ore is between 3.0 and 0.6.

In another aspect, alone or in combination with any one of the previous aspects, the method further comprises directly introducing the metallic iron to an electric arc furnace. In another aspect, alone or in combination with any one of the previous aspects, the introducing of the metallic iron to an electric arc furnace is continuous or semi-continuous.

In another example, a direct reduction of iron (DRI) system is provided, the system comprising a direct reduction unit configured to receive a source of iron ore and a reducing gaseous mixture feed comprising at least hydrogen and carbon monoxide, a scrubber unit configured to receive a top gas feed from the direct reduction unit, and a top gas separator unit to receive the top gas feed from the scrubber unit and to provide a carbon dioxide by-product feed and an unreacted hydrogen and carbon monoxide feed, a process gas separator unit configured to receive the unreacted hydrogen and/or carbon monoxide from the top gas separator unit and to provide a carbon monoxide feed and an essentially pure hydrogen feed, and a carbon dioxide geological sequestering unit configured to receive the $CO_2$ by-product feed from the separator unit. In one example, the top gas separator unit is a $CO_2$ capture unit that selectively provides the $CO_2$ by-product feed and an unreacted hydrogen and an unreacted carbon monoxide feed.

In one aspect, the reducing gaseous mixture feed comprises hydrogen and carbon monoxide. In another aspect, alone or in combination with any one of the previous aspects, the carbon monoxide feed from the top gas feed is recycled to the reducing gaseous mixture feed.

In another aspect, alone or in combination with any one of the previous aspects, the system further comprises a drying unit configured to receive the $CO_2$ by-product feed. In another aspect, alone or in combination with any one of the previous aspects, the system further comprises a compressor configured to receive the $CO_2$ by-product. In another aspect, alone or in combination with any one of the previous aspects, the compressor is configured to provide supercritical $CO_2$ to a pipeline for geological sequestering.

In another aspect, alone or in combination with any one of the previous aspects, the carbon dioxide geological sequestering unit is coupled to one or more subterranean oil reservoirs, natural gas deposits, un-mineable coal deposits, saline formations, shale, and basalt formations.

In another aspect, alone or in combination with any one of the previous aspects, the system further comprises a hydrogen storage unit configured to receive the essentially pure hydrogen feed from the pressure swing absorption unit.

In another aspect, alone or in combination with any one of the previous aspects, the system further comprises an electric arc furnace configured to receive the metallic iron. In another aspect, alone or in combination with any one of the previous aspects, the electric arc furnace is configured to receive the metallic iron continuously or semi-continuously. In another aspect, alone or in combination with any one of the previous aspects, the system is closed loop.

In another example, a method of producing ammonia during direct reduction of iron is provided, the method comprising separating air into an oxygen stream and a nitrogen stream, introducing the oxygen stream to a partial oxidation unit for providing syngas comprising hydrogen and carbon monoxide, generating metallic iron from its ore and a top gas in a direct reduction unit using the syngas, separating the top gas into an essentially pure stream of hydrogen, combining the essentially pure stream of hydrogen with the nitrogen stream, and producing ammonia. In another aspect, alone or in combination with any one of the previous aspects, the ammonia is continuously or semi-continuously produced, optionally with the sequestering of carbon dioxide ($CO_2$). In another aspect, alone or in combination with any one of the previous aspects, the ammonia is produced in a closed loop system. In another aspect, alone or in combination with any one of the previous aspects, the ammonia is produced with concurrent carbon dioxide ($CO_2$) sequestering so as to provide blue ammonia.

In another example, a method of producing a hydrocarbon-based fuel during direct reduction of iron ore, the method comprising: generating metallic iron from its ore and a top gas in a direct reduction unit using a syngas comprising hydrogen and carbon monoxide (CO), separating the top gas into an essentially pure stream of hydrogen and an essentially pure stream of carbon dioxide ($CO_2$), combining the essentially pure stream of hydrogen with the essentially pure stream of $CO_2$, and producing hydrocarbon-based fuel. In another aspect, alone or in combination with any one of the previous aspects, the hydrocarbon-based fuel is continuously or semi-continuously produced, optionally with the sequestering of carbon dioxide ($CO_2$). In another aspect, alone or in combination with any one of the previous aspects, the hydrocarbon-based fuel is produced in a closed loop system.

In another aspect, alone or in combination with any one of the previous aspects, the hydrocarbon fuel is produced with concurrent carbon dioxide ($CO_2$) sequestering so as to provide blue hydrocarbon fuel. In another aspect, alone or in combination with any one of the previous aspects, the blue hydrocarbon-based fuel is jet fuel In another example, a retrofit system for a direct reduction of iron (DRI) unit is provided, the retrofit system comprising a scrubber unit configured to receive a top gas feed from a direct reduction unit, a top gas separator unit to receive the top gas feed from the scrubber unit and to provide a carbon dioxide by-product feed and an unreacted hydrogen and carbon monoxide feed, a process gas separator unit configured to receive the unreacted hydrogen and/or carbon monoxide from the top gas separator unit and to provide a carbon monoxide feed and an essentially pure hydrogen feed, and a $CO_2$ geological sequestering unit configured to receive the carbon dioxide by-product feed from the scrubber unit.

BRIEF DESCRIPTION OF THE DRAWINGS

In order to understand and to see how the present disclosure may be carried out in practice, examples will now be described, by way of non-limiting examples only, with reference to the accompanying drawings, in which.

DETAILED DESCRIPTION

Figure 1:
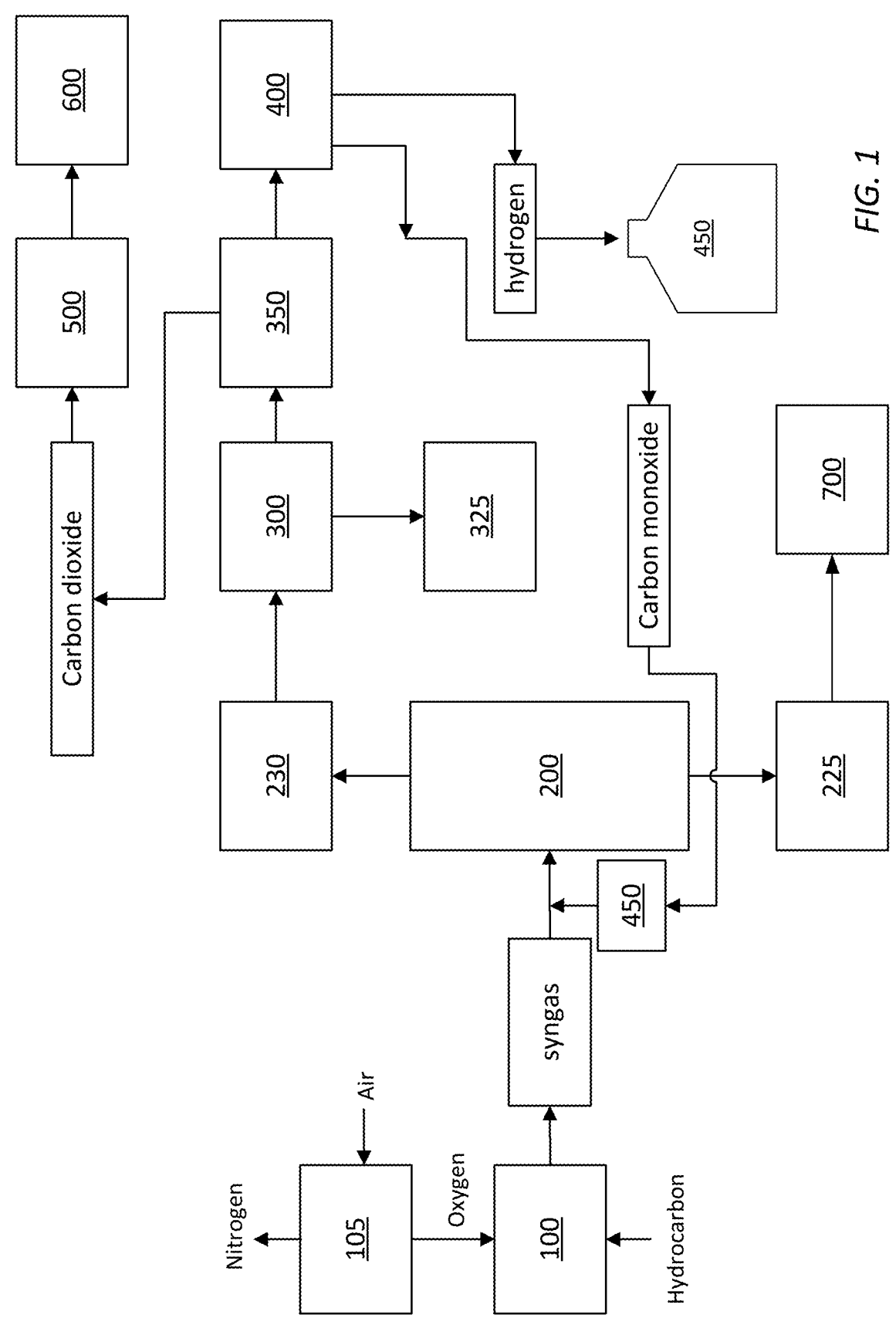
FIG. 1 is a schematic flow diagram illustrating the main steps for performing a DRI process with carbon dioxide sequestering in accordance with an aspect of the present disclosure.

This disclosure provides for a DRI process that provides for the capability of producing "blue hydrogen" and subsequently the production of "blue steel." This disclosure further provides a method of direct reducing iron from its ore that involves increases the amount of carbon monoxide (CO) used in a syngas mixture, with subsequent permanent sequestration of by-product carbon dioxide ($CO_2$) produced during the reduction of the iron ore. In one example, the by-product $CO_2$ is dried and compressed to a supercritical state for permanent sequestration. In another example, the by-product $CO_2$ is geologically sequestered.

In another example, the geologic sequestration can be combined with one or more of terrestrial sequestration or mineral sequestration processes.

Much effort is underway to produce iron and steel from iron ore using hydrogen. This disclosure further provides for the production and storage of "blue hydrogen." Iron/steel production does not use blue hydrogen, rather, it uses more of the syngas co-reactant carbon monoxide that comes about when natural gas or other hydrocarbon feedstocks are used (e.g., steam reformed, partial oxidation (POX)) to generate hydrogen and carbon monoxide "syngas" stream which provides a source of reducing gaseous mixture for DRI.

Iron ore can be reduced to provide DRI using a reducing medium. In one example, the reducing medium can be a reducing gaseous mixture. A reducing gaseous mixture can be partially oxidized natural gas. In one example, a partial oxidation process is used in which the feed fuel, such as methane or a suitable hydrocarbonaceous fuel, reacts exothermically in the presence of a small amount of air or oxygen. An exemplary reducing gaseous mixture is partially oxidized natural gas comprising a mixture of hydrogen and carbon monoxide, e.g., "syngas." Syngas, when mixed with iron ore, acts as the reducing agent to reduce the iron ore by extracting oxygen from the ore. In one example, the syngas of mixed hydrogen and carbon monoxide is produced by the partial oxidation of natural gas or other hydrocarbons in a partial oxidation unit (POX) using almost pure oxygen in a less than stoichiometric amount relative to the natural gas or hydrocarbons.

The reduction of iron oxide into DRI can be represented by the following general reaction schemes:

$$Fe_2O_3 + 3H_2 \rightarrow 2Fe + 3H_2O \qquad \text{Equation (I)}$$

$$Fe_2O_3 + 3CO \rightarrow 2Fe + 3CO_2 \qquad \text{Equation (II)}$$

It is desirable to eliminate $CO_2$ from such DRI processes as $CO_2$ is a global warming gas. This present disclosure, in one example, provides for a method and system that increases the amount of carbon monoxide in the syngas, which otherwise results in more, rather than less, $CO_2$ produced during DRI, whereas the present method prevents or eliminates emission of that excess $CO_2$ by-product to the atmosphere. In one example, the $CO_2$ is dried and/or compressed into a supercritical state. In yet another example, the supercritical $CO_2$ is permanently sequestered. In one example, permanently sequestering the $CO_2$ involves geological sequestering. As used herein, geological sequestration and is grammatical equivalents is inclusive of permanently storing $CO_2$ in subsurface and/or subterranean structures. In one example, subsurface and/or subterranean structures include but are not limited to, subterranean oil reservoirs, natural gas deposits, un-mineable coal deposits, saline formations, shale, and basalt formations.

With reference now to the figures, that depict a direct reducing iron system and method of the present disclosure, FIG. 1 shows a schematic where air is introduced into an air separator unit 105, such as a fractional distiller, air separation unit (ASU), pressure swing absorption unit (PSA), or vacuum pressure swing absorption unit (VPSA), and oxygen is combined with hydrocarbon, such as natural gas for example, in partial oxidation unit 100 (e.g., "POX unit") to provide syngas. In one example, syngas is provided at high temperature into DRI unit 200 together with iron ore to facilitate the direct reduction of the iron ore and to provide metallic iron, for example, for use in steel making.

In one example, syngas exiting POX unit 100 is at a temperature of approximately 1,350° C. and is mixed with carbon monoxide from unreacted reducing gaseous mixture feed leaving the DRI unit 200. Tog gas stream 230 exits DRI unit 200 and is introduced to scrubber unit 300, which can remove dust and/or particulate matter. After passing through scrubber unit 300, top gas stream 230 is introduced to process gas separator unit 400. In one example, carbon monoxide from unreacted reducing gaseous mixture feed leaving the DRI and after passing thru process gas separator unit 400 is compressed in compressor 450 and then introduced into hot syngas feed. In this example, an amount of pressurized excess carbon monoxide, at a temperature less than about 1000° C., is introduced into the hot syngas feed, cooling the hot syngas prior to introduction to the DRI unit 200 and/or iron ore, thereby reducing sintering and other unwanted effects in the DRI unit 200. In one example, the syngas with excess carbon monoxide is introduced to the DRI unit 200 at a temperature of about 900° C., about 1000° C., about 1100° C., or about 1200° C.

In one example, syngas feed introduced to the DRI unit 200 is adjusted with compressed, essentially pure carbon monoxide from process gas separator unit 400, such that the ratio of hydrogen to carbon monoxide ($H_2/CO$) is between 3.0 and 0.6. In one example, the ratio of hydrogen to carbon monoxide ($H_2/CO$) is less than 3, less than 2, less than 1.5, less than 1.0 or less than 0.7 while being greater than 0.6.

In one example, process gas separator unit 400 independently provides a source of carbon monoxide, e.g., carbon monoxide with a purity of about 40% to about 98%, with remainder amounts of one or more of nitrogen ($N_2$), water vapor ($H_2O$), hydrogen ($H_2$), methane ($CH_4$) and carbon dioxide ($CO_2$). Process gas separator unit 400 can include a cryogenic separator, a pressure swing absorption unit (PSA), or a vacuum pressure swing absorption unit (VPSA), and the like. In one example, the pure carbon monoxide from unreacted reducing gaseous mixture feed that exits process gas separator unit 400, provides for recycling of carbon monoxide. In one example, the excess carbon monoxide from unreacted reducing gaseous mixture feed leaving the DRI unit is scrubbed in scrubber unit 300, separated from carbon dioxide in top gas separator unit 350, separated from hydrogen in process gas separator unit 400, and compressed in compressor 450 before being introduced/recycled to the reducing gaseous mixture feed (e.g., syngas).

In one example, the reduced iron 225 from the DRI Unit 200 is delivered to an electric arc furnace (EAF) 700. In another example, the reduced iron 225 is delivered directly to the electric arc furnace 700. In another example, the reduced iron to 25 is delivered continuously or semi-continuously to the electric arc furnace 700.

Unreacted syngas together with water vapor and $CO_2$ byproduct exit the top of the DRI unit 200 as top gas stream 230. In one example, water 325 is condensed out of the top gas stream 230 via scrubber unit 300, and the $CO_2$ byproduct is the separated in top gas separator unit 350, providing a purified $CO_2$ byproduct stream. Top gas separator unit 350 can include a cryogenic separator, a pressure swing absorption unit (PSA), or a vacuum pressure swing absorption unit (VPSA), and the like. The purified $CO_2$ byproduct stream is then dried and compressed in compressor unit 500 and presented to $CO_2$ geological sequestration unit 600. Remaining gas exiting the top gas separator unit 350 is rich in hydrogen and also contains amounts of carbon monoxide. Thus, hydrogen and carbon monoxide exiting top gas separator unit 350 are then separated in process gas separator unit 400. Process gas separator unit 400 provides a source of "blue hydrogen" that is essentially pure blue hydrogen, for example, at least 96%, at least 97% or at least 98% pure hydrogen. This essentially pure blue hydrogen can be stored, such as in tank 750.

Figure 2:
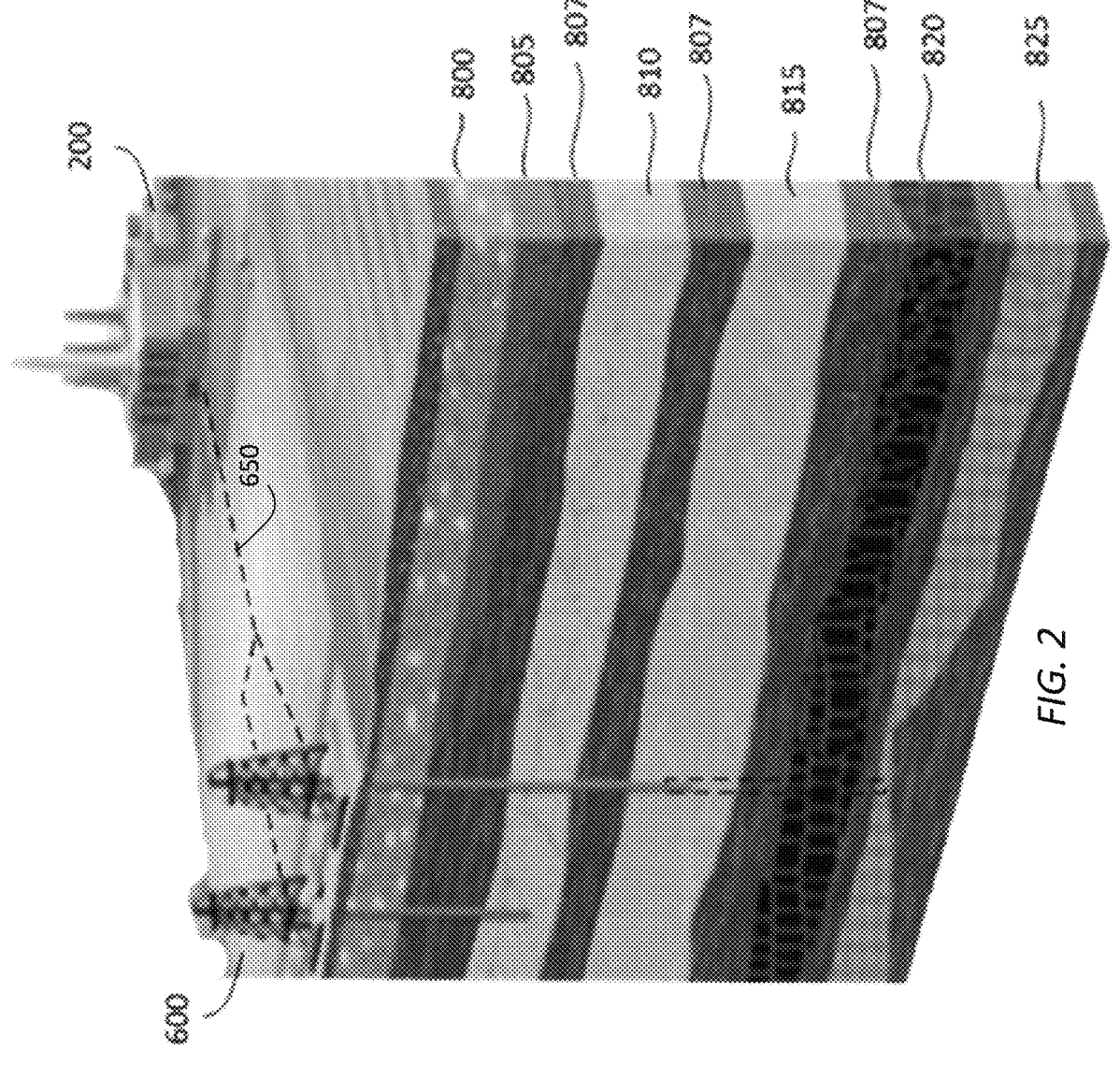
FIG. 2 is a schematic illustrating the $CO_2$ sequestering process in accordance with an aspect of the present disclosure.

With reference to FIG. 2, DRI unit 200 is coupled via pipeline 650 to $CO_2$ geological sequestering unit 600. In one example, an existing DRI unit 200 comprising a partial oxidation unit or steam reformer is retrofitted with a scrubber unit configured to receive a top gas feed, a top gas separator unit to receive the top gas feed from the scrubber unit and to provide a carbon dioxide byproduct feed and in unreacted hydrogen and carbon monoxide feed, and a process gas separator unit configured to receive the unreacted hydrogen and/or carbon monoxide from the top gas separator unit and to provide an essentially pure carbon monoxide feed and an essentially pure hydrogen feed. In one example, one or more additional components e.g., for heat recovery and/or heating is employed in such a retrofit.

Byproduct $CO_2$ is geologically sequestered into one or more subsurface and/or subterranean structures. In one example, the one or more subsurface and/or subterranean structures are deeper than colluvium or alluvium layers 800 or subterranean fresh water 805. In one example, byproduct $CO_2$ is geologically sequestered into subsurface and/or subterranean structures that include but are not limited to, subterranean oil reservoirs 810 sandwiched between confinement layers 807, natural gas deposits 815, un-mineable coal deposits 820, saline formations 825, shale, and/or basalt formations (not shown).

Figure 3:
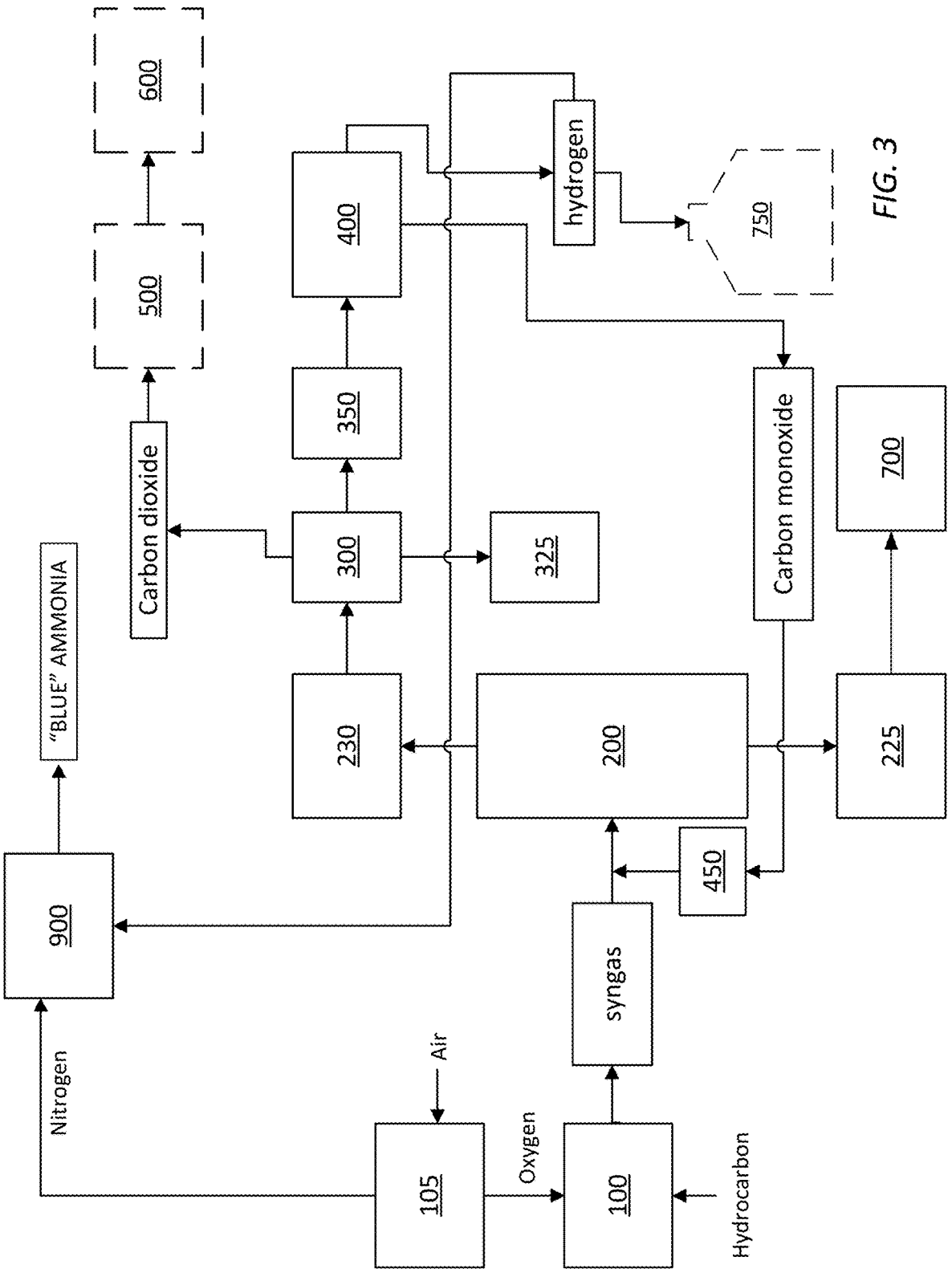
FIG. 3 is a schematic flow diagram illustrating the main steps for performing an ammonia synthesis process with DRI in accordance with another aspect of the present disclosure.

With reference to FIG. 3, an alternate embodiment of the present disclosure is provided, where the method and system, alone or in combination with the $CO_2$ sequestering, is used to provide a source of "blue" ammonia. Thus, essentially pure nitrogen from air separator unit 105, together with essentially pure blue hydrogen stream from process gas separator unit 400 is sent to converter 900 for producing "blue" ammonia. Converter 800 encompasses conventional Haber or Haber-Bosch process, Nernst process (iron catalyzed), Kellogg, or solid state heterogeneous catalytic processes equipment, or the like. In FIG. 3, the sequestering of $CO_2$ and/or storage of hydrogen is optional.

Figure 4:
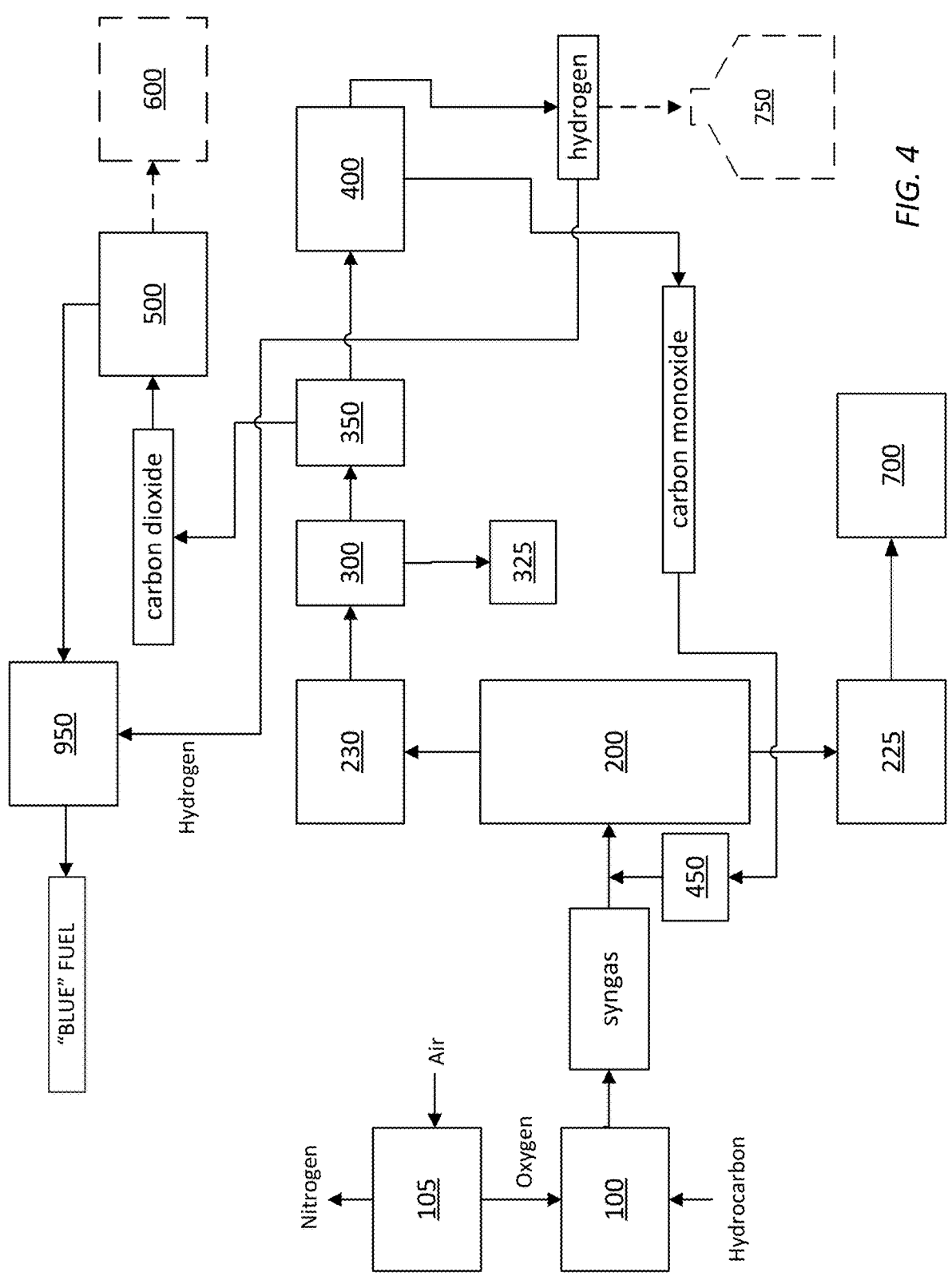
FIG. 4 is a schematic flow diagram illustrating the main steps for performing a hydrocarbon-based fuel synthesis process with DRI in accordance with another aspect of the present disclosure.

With reference to FIG. 4, an alternate embodiment of the present disclosure is provided, where the method and system, alone or in combination with the $CO_2$ sequestering, is used to provide a source of "blue" fuel, such as jet fuel. Thus, essentially pure, scrubbed and dried $CO_2$ from scrubber unit 300/top gas separator unit 350 and/or dry $CO_2$ from compressor/drier unit 500, together with essentially pure blue hydrogen stream from process gas separator unit 400 is sent to catalytic converter 950 for producing "blue" hydrocarbon-based fuel, such as jet fuel. Catalytic converter 900 can include indirect (via methanol) or direct processing (reverse water shift reactions), Fisher-Tropsch synthesis (hydrogenation), iron-manganese-potassium catalysts, or the like. In FIG. 4, the sequestering of $CO_2$ and/or storage of hydrogen is optional.

Thus, the present disclosure provides for, in one example, a closed loop system where essentially pure $CO_2$ is sequestered, and essentially pure hydrogen collected for sale essentially without any carbon emissions. The present disclosure provides for "blue iron" being produced that when coupled with an electric arc furnace or the like ultimately provides "blue steel."

Whereas traditional processing of iron ore to make metallic iron results in as much as one ton of $CO_2$ emissions per ton of iron, the present disclosure provides for a process that results in essentially zero tons of $CO_2$ emissions per ton of iron.

While certain embodiments of the present disclosure have been illustrated with reference to specific combinations of elements, various other combinations may also be provided without departing from the teachings of the present disclosure. Thus, the present disclosure should not be construed as being limited to the particular exemplary embodiments described herein and illustrated in the Figures, but may also encompass combinations of elements of the various illustrated embodiments and aspects thereof.

We claim:

1. A method of direct reduction of iron (DRI) comprising:
  reducing a source of iron ore with a reducing gaseous mixture feed to produce a direct reduced iron product and a top gas feed;
  scrubbing the top gas feed;

separating the top gas feed to provide a carbon dioxide by-product feed and an unreacted hydrogen and carbon monoxide feed;
  processing unreacted hydrogen and/or unreacted carbon monoxide from the unreacted hydrogen and carbon monoxide feed to provide a carbon monoxide feed and an essentially pure hydrogen feed; and
  sequestering the carbon dioxide by-product feed;
  wherein the reducing gaseous mixture feed is provided to a DRI unit by a partial oxidation unit (POX).

2. The method of claim 1, wherein the reducing gaseous mixture feed comprises hydrogen and carbon monoxide.

3. The method of claim 2, wherein additional carbon monoxide is added to the reducing gaseous mixture feed.

4. The method of claim 1, wherein the $CO_2$ by-product feed is separated from water vapor and the unreacted reducing gaseous mixture feed prior to sequestering.

5. The method of claim 1, wherein the $CO_2$ by-product feed is dried prior to sequestering.

6. The method of claim 1, wherein the $CO_2$ by-product feed is compressed to a supercritical state prior to sequestering.

7. The method of claim 1, wherein unreacted hydrogen from the reducing gaseous mixture feed is separated from water vapor and the unreacted reducing gaseous mixture feed prior to sequestering.

8. The method of claim 7, wherein the unreacted hydrogen is captured and stored.

9. The method of claim 1, further comprising introducing the direct reduced iron product to an electric arc furnace.

10. The method of claim 9, wherein the introducing of the direct reduced iron product to an electric arc furnace is continuous or semi-continuous.

\* \* \* \* \*